United States Patent [19]
Bush

[11] Patent Number: 4,597,953
[45] Date of Patent: Jul. 1, 1986

[54] HALOGEN RECOVERY

[75] Inventor: J. Finley Bush, Plum Boro, Pa.

[73] Assignee: Aluminum Company of America, Pittsburgh, Pa.

[21] Appl. No.: 703,323

[22] Filed: Feb. 20, 1985

[51] Int. Cl.[4] .............................................. C01F 7/50
[52] U.S. Cl. .................... 423/132; 423/461; 423/489
[58] Field of Search ................ 423/132, 461, 489, 556

[56] References Cited

U.S. PATENT DOCUMENTS

| | | | |
|---|---|---|---|
| 2,858,198 | 10/1958 | McGeer et al. | 423/489 |
| 3,106,448 | 10/1963 | Whicher et al. | 23/88 |
| 3,485,579 | 12/1969 | Vancil et al. | 423/132 |
| 3,635,408 | 1/1972 | Williams | 241/1 |
| 4,477,425 | 10/1984 | Berry et al. | 423/556 |

FOREIGN PATENT DOCUMENTS

| | | |
|---|---|---|
| 2056422A | 3/1981 | United Kingdom . |
| 2056425A | 3/1981 | United Kingdom . |
| 2059403A | 4/1981 | United Kingdom . |

OTHER PUBLICATIONS

Blayden, Lee C. and Epstein, Seymour G., "Spent Potlining Symposium," *Journal of Metals*, vol. 36, No. 7, Jul. 1984.

*Primary Examiner*—John Doll
*Assistant Examiner*—Jeffrey E. Russel
*Attorney, Agent, or Firm*—Douglas G. Glantz

[57] ABSTRACT

Disclosed is a process for dissolving halogen in a bath having an aluminum sulfate/sulfuric acid ratio in the range of about 0.75 to 1.0. The process is useful in extracting fluorine in high yield from spent cell linings recovered from an electrolytic reduction cell for the production of aluminum.

9 Claims, 2 Drawing Figures

HALOGEN RECOVERY

BACKGROUND OF THE INVENTION

This invention relates to a method for recovering halogen from a carbonaceous material such as carbonaceous lining material used in electrolytic reduction cells, e.g., such as for the electrolytic production of aluminum from alumina dissolved in cryolite.

Electrolytic reduction cells for producing aluminum from alumina dissolved in cryolite require a container for holding the bath of molten salts. The containers for holding the molten salts typically are lined with a carbonaceous material to protect the steel of the container walls. The carbon lining is composed of a purified coke and carbonaceous binders such as tar or pitch in a layer of substantial thickness, e.g., such as 10 to 20 inches. The carbon lining can be surrounding by an outer layer of insulation such as insulating brick. However, insulation is not impervious to the transfer of molten salt ions from the electrolytic bath into the carbon lining.

Aluminum production in the electrolytic cell requires temperatures over 900° C. for extended periods of time. It is well known that in the course of extended operation of the aluminum reduction cell, significant amounts of molten salts including fluorides are absorbed into the carbon liner. The cell eventually becomes cracked and distorted and must be taken out of operation. The cell is shut down and the deteriorated contents of the cell including the carbon liner and insulation are removed.

The spent carbon lining represents a valuable resource for the fluorine which has been absorbed from the fused cryolite bath into the carbon lining over the extended smelting performed in the cell.

Cryolite recovery plants have been operated for leaching cryolite from the spent carbon lining using caustic solutions. Caustic solutions can be drawn from an alumina refinery, and waste liquor returned to it.

An alternative and separate process for removing fluoride from carbon includes dissolving the fluoride in a sulfuric acid bath applied to the carbon lining.

It is an object of the present invention to increase the amount of fluoride extracted from the carbonaceous material of spent cell linings used in the electrolytic smelting of aluminum.

It is another object of the present invention to recover fluoride which could be used in subsequent chemical processes, e.g., as an $AlF_3$ feed to an aluminum reduction cell.

These and other objects of the present invention will become apparent from the description of the invention which follows.

SUMMARY OF THE INVENTION

In accordance with the present invention, halide such as fluoride is dissolved in a bath having an aluminum sulfate/sulfuric acid ratio range of about 0.75 to 1.0.

DETAILED DESCRIPTION

It has been found that halide is dissolved in high yield from a carbonaceous material in a bath having an aluminum sulfate/sulfuric acid ratio in the range of about 0.75 to 1.0. The process for dissolving the halogen can be viewed as an extraction process. For example, fluoride can be extracted from the carbonaceous material used as lining in an electrolytic reduction cell for producing aluminum from alumina dissolved in cryolite bath. After an extended operation of the electrolytic cell, deteriorated lining is removed. Fluorine can be extracted from this spent carbonaceous material and recycled for further chemical processing.

Figure 1:
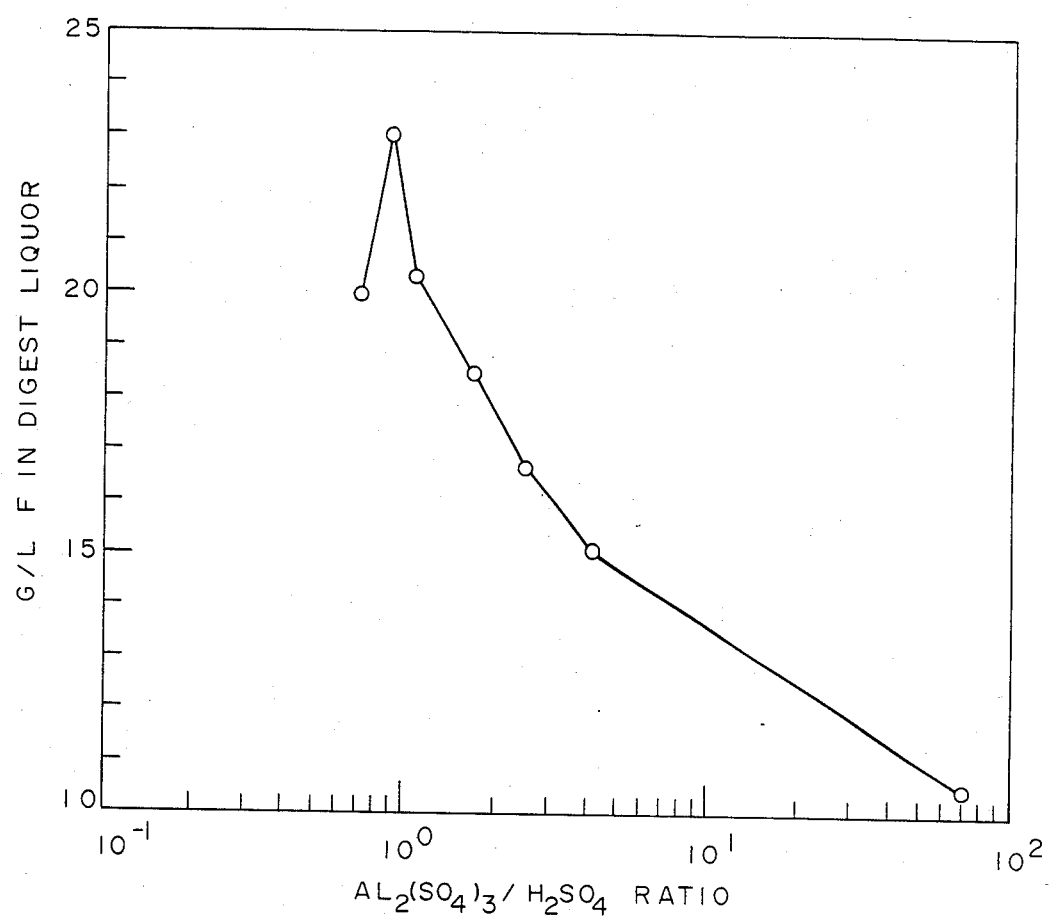
FIG. 1 represents a graph plot of extracted fluoride as a function of aluminum sulfate/sulfuric acid ratio.

Referring now to the graph depicted in FIG. 1, it has been found that the aluminum sulfate/sulfuric acid ratio of the bath contacting the spent cell lining must fall somewhere in the range of about 0.75 to 1.0. Preferably, the ratio falls in the range of 0.84 to 0.90. Below about 0.75, the concentration of $Al^{+++}$ ion is too low, and fluorine will not go into solution. On the other end of the range, a concentration of aluminum ion over about 0.1 precipitates the fluorine.

Initial experimental work leading up to the present invention indicated that aluminum sulfate and cryolite reacted in aqueous solution to produce high fluorine extraction. The reaction then occurs in the digest step and can be written as follows:

$$2(AlF_3 \cdot 3NaF) + Al_2(SO_4)_3(aq.) \rightarrow 4AlF_3(aq.) + 3Na_2SO_4(aq.) \quad (1)$$

The resulting solution is heated to about 95° C. or higher to dissolve the sodium aluminum fluoride compounds and to form a homogeneous solution of aluminum fluoride, aluminum sulfate, and sodium sulfate. An excess of aluminum sulfate holds the aluminum fluoride in solution. Dilute solutions have a higher molar ratio of aluminum fluoride than aluminum sulfate. Aluminum fluoride concentration and aluminum sulfate concentration is controlled to maximize fluoride production while minimizing the required amount of aluminum sulfate.

Dilute concentrations of aluminum sulfate, i.e., less than 12 g/L have been found to produce high fluoride extraction but require excessive amounts of aluminum sulfate. Attempts to achieve digests of high fluoride concentration through high aluminum fluoride/aluminum sulfate ratio were found to decrease fluoride extraction from the carbon cell lining.

The aluminum sulfate, sulfuric acid, and hydrate system produces a significant decrease in aluminum sulfate solubility with excess hydrates. In accordance with the present invention, it has been found that the initial aluminum ion in solution can be controlled by varying the aluminum sulfate/sulfuric acid ratio to achieve fluoride extraction in high yield.

Figure 2:
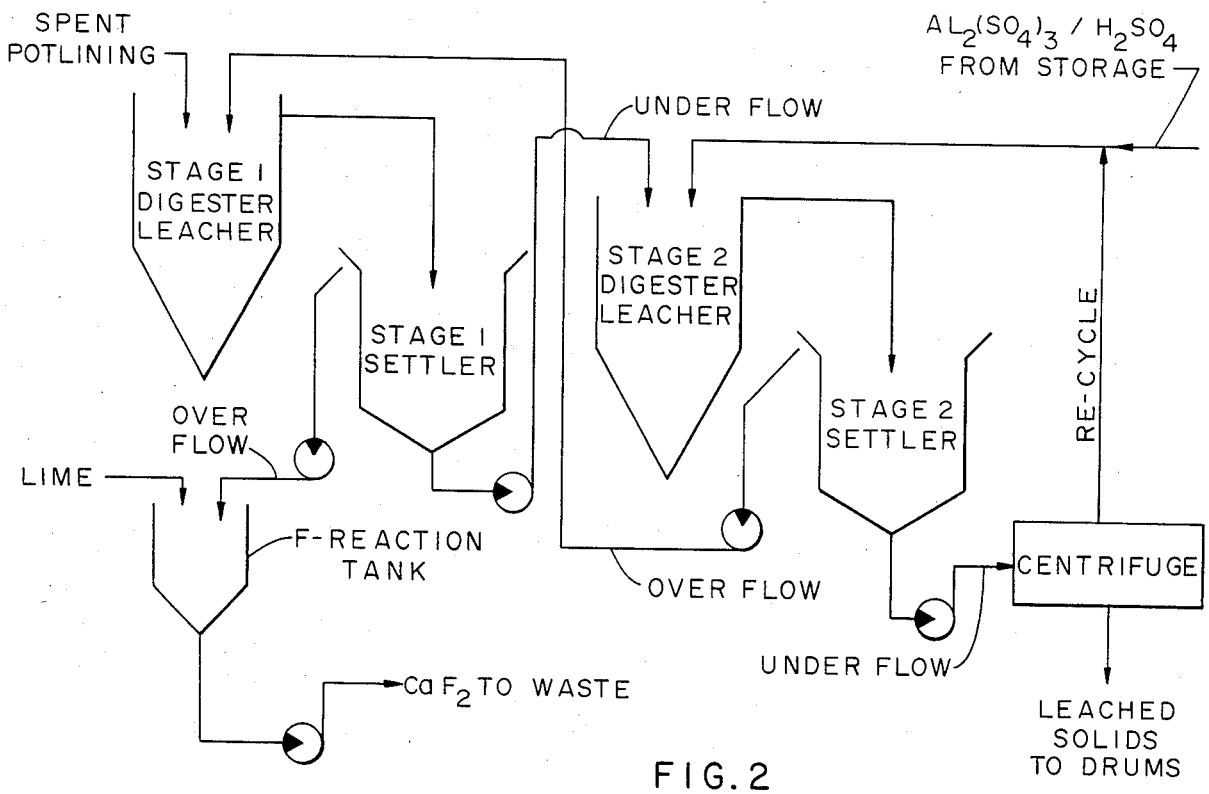
FIG. 2 is a schematic diagram of an extraction process.

Referring now to FIG. 2, a schematic processing scheme is depicted for extracting fluorine from spent potlining in a two-stage countercurrent unit operation. Extraction fluid flow rate was 5.55 L/minute. Results are shown in Table I. Operation of the two-stage unit extracted 95% of the sodium and 93% of the fluoride. Cyanide was released during acidification and was captured and destroyed in an incinerator.

TABLE II

Results on One and Two Stage Extraction of F and Na Values from SPL Using $Al_2(SO_4)_3/H_2SO_4$ Process

| | Single Stage Run | 2 Stage Run |
|---|---|---|
| % Extracted | | |
| 1st Stage | | |
| F | 85 | 46 |

TABLE II-continued

Results on One and Two Stage Extraction of F and Na Values from SPL Using Al$_2$(SO$_4$)$_3$/H$_2$SO$_4$ Process

|  | Single Stage Run | 2 Stage Run |
|---|---|---|
| Na | 91 | 64 |
| Al | 60 | 32 |
| Fe | 94 | 91 |
| % Extracted 2nd Stage |  |  |
| F | — | 93 |
| Na | — | 95 |
| Al | — | 63 |
| Fe | — | 99 |
| Final Liquor Analysis (g/L) |  |  |
| F | 20 | 21 |
| Na | 20 | 19 |
| Fe | 2.0 | 2.3 |
| Liquor Rate (L/min) | 2.8 | 5.6 |
| SPL Rate (kg/hr) | 20 | 39 |

Initial Liquor was 88 g/L So$_4^{-2}$ with an Al$_4$(SO$_4$)$_3$/H$_2$SO$_4$ ratio of .870.

What is claimed is:

1. Dissolving fluorine in a bath having an aluminum sulfate/sulfuric acid ratio in the range of about 0.75 to 1.0.

2. claim 1 wherein said dissolving halogen comprises extracting fluorine from carbonaceous material.

3. claim 2 wherein said carbonaceous material comprises spent cell lining from aluminum electrolytic reduction cell.

4. claim 3 wherein said ratio falls in the range of about 0.84 to about 0.90.

5. A method for extracting fluorine from fluorine-containing carbonaceous material comprising contacting said fluorine-containing carbonaceous material with a bath having an aluminum sulfate/sulfuric acid ratio in the range of about 0.75 to 1.0.

6. A method as set forth in claim 5 wherein said carbonaceous material comprises spent cell lining.

7. The method as set forth in claim 6 wherein said ratio falls in the range of about 0.84 to 0.90.

8. A method as set forth in claim 7 wherein said extracting is achieved in a two-stage countercurrent flow unit.

9. A process for extracting fluorine from a carbonaceous cell lining used in an electrolytic reduction cell for producing aluminum from alumina dissolved in cryolite comprising, contacting fluorine-containing carbonaceous material with a bath having an aluminum sulfate/sulfuric acid ratio in the range of about 0.75 to 1.0.

* * * * *

UNITED STATES PATENT AND TRADEMARK OFFICE
CERTIFICATE OF CORRECTION

PATENT NO. : 4,597,953

DATED : July 1, 1986

INVENTOR(S) : J. Finley Bush

It is certified that error appears in the above-identified patent and that said Letters Patent is hereby corrected as shown below:  Title page:

Under References Cited:

| | |
|---|---|
| 2,858,198 | Change "423/489" to --23/294--. |
| Col. 2, line 18 | Change "0.1" to --1.0--. |
| Col. 2, line 21 | Change "fluorine" to --fluoride--. |
| Claim 2, Col. 4, line 1 | Change "claim" to --Claim--. |
| Claim 3, Col. 4, line 3 | Change "claim" to --Claim--. |
| Claim 4, Col. 4, line 6 | Change "claim" to --Claim--. |

Signed and Sealed this

Twenty-first Day of October, 1986

[SEAL]

*Attest:*

DONALD J. QUIGG

*Attesting Officer*   *Commissioner of Patents and Trademarks*